United States Patent
Minato et al.

(10) Patent No.: US 10,625,718 B2
(45) Date of Patent: Apr. 21, 2020

(54) BRAKE SYSTEM AND BRAKE CONTROL METHOD

(71) Applicant: NABTESCO AUTOMOTIVE CORPORATION, Tokyo (JP)

(72) Inventors: Ichiro Minato, Tokyo (JP); Hiroki Hasebe, Tokyo (JP); Kazuya Yoketa, Tokyo (JP)

(73) Assignee: NABTESCO AUTOMOTIVE CORPORATION, Tokyo (JP)

( * ) Notice: Subject to any disclaimer, the term of this patent is extended or adjusted under 35 U.S.C. 154(b) by 0 days.

(21) Appl. No.: 15/320,555

(22) PCT Filed: Jun. 23, 2015

(86) PCT No.: PCT/JP2015/068069
§ 371 (c)(1),
(2) Date: Dec. 20, 2016

(87) PCT Pub. No.: WO2015/199083
PCT Pub. Date: Dec. 30, 2015

(65) Prior Publication Data
US 2017/0144639 A1 May 25, 2017

(30) Foreign Application Priority Data
Jun. 24, 2014 (JP) ................. 2014-128763

(51) Int. Cl.
*B60T 8/17* (2006.01)
*B62D 61/12* (2006.01)
(Continued)

(52) U.S. Cl.
CPC .............. *B60T 8/1708* (2013.01); *B60T 8/00* (2013.01); *B60T 8/172* (2013.01); *B60T 8/349* (2013.01);
(Continued)

(58) Field of Classification Search
CPC . B60T 8/72; B60T 8/171; B60T 8/172; B60T 8/323; B60T 8/1708; B60T 8/1755;
(Continued)

(56) References Cited

U.S. PATENT DOCUMENTS 4,383,696 A    5/1983  Picard
4,460,220 A *  7/1984  Petersen ................. B60T 8/349
                                                          303/113.5
(Continued)

FOREIGN PATENT DOCUMENTS

DE         3201045 A1      2/1983
DE         4319943 C1 *    8/1994
(Continued)

OTHER PUBLICATIONS

International Preliminary Report on Patentability and the Written Opinion of the International Searching Authority as issued in International Patent Application No. PCT/JP2015/068069, dated Dec. 27, 2016.
(Continued)

*Primary Examiner* — Robert A. Siconolfi
*Assistant Examiner* — San M Aung
(74) *Attorney, Agent, or Firm* — Pillsbury Winthrop Shaw Pittman, LLP

(57) ABSTRACT

A brake system includes a service brake and a parking brake that brake a vehicle including a lift axle capable of ascending and descending. The brake system further includes a brake blocker device and a controller that controls the brake blocker device. The brake blocker device blocks at least one of supply of compressed air to the service brake and supply of compressed air to the parking brake. The service brake and the parking brake act on the lift axle. The controller actuates the brake blocker device when the lift axle is at a lifted position.

4 Claims, 1 Drawing Sheet

(51) Int. Cl.
*B60T 8/00* (2006.01)
*B60T 8/34* (2006.01)
*B60T 8/172* (2006.01)
*B60T 11/10* (2006.01)
*B60T 11/34* (2006.01)
*B60T 13/26* (2006.01)
*B60T 13/68* (2006.01)
*B60T 17/00* (2006.01)
*B60T 8/32* (2006.01)

(52) U.S. Cl.
CPC ........... *B60T 11/102* (2013.01); *B60T 11/103* (2013.01); *B60T 11/108* (2013.01); *B60T 11/34* (2013.01); *B60T 13/26* (2013.01); *B60T 13/683* (2013.01); *B60T 17/004* (2013.01); *B62D 61/12* (2013.01); *B60T 8/3285* (2013.01); *B60T 2270/10* (2013.01); *B60T 2270/20* (2013.01)

(58) Field of Classification Search
CPC ............. B60T 2201/09; B60T 2230/06; B60T 2270/413; B60T 13/662; B60T 17/18; B62D 61/12; B60G 17/0195; B60G 2204/47; B60G 2400/60
USPC .......................................................... 303/84.2
See application file for complete search history.

(56) References Cited

U.S. PATENT DOCUMENTS

| | | | | |
|---|---|---|---|---|
| 6,238,013 | B1* | 5/2001 | Koelzer | B60T 8/361 137/627.5 |
| 2002/0066628 | A1* | 6/2002 | Goodell | B60T 15/045 188/353 |
| 2002/0117823 | A1* | 8/2002 | Mlsna | B60G 17/0523 280/86.5 |
| 2002/0189882 | A1* | 12/2002 | Eberling | B60T 17/221 180/281 |
| 2006/0170168 | A1* | 8/2006 | Rotz | B60G 17/0155 280/5.501 |
| 2009/0127926 | A1* | 5/2009 | Fries | B60T 17/02 303/15 |
| 2010/0125398 | A1* | 5/2010 | Headlee | B60L 7/26 701/71 |
| 2010/0186827 | A1* | 7/2010 | Ertl | B60T 17/002 137/115.25 |
| 2011/0005874 | A1* | 1/2011 | Beier | B60T 7/042 188/106 F |
| 2012/0153711 | A1* | 6/2012 | Minato | B60T 13/662 303/10 |
| 2012/0306259 | A1* | 12/2012 | Minato | B60T 13/662 303/6.01 |
| 2015/0246666 | A1* | 9/2015 | Sell | B60T 15/027 303/113.2 |

FOREIGN PATENT DOCUMENTS

| | | |
|---|---|---|
| EP | 0056432 A1 | 7/1982 |
| EP | 2679458 A2 * | 1/2014 |
| JP | 2002-205524 A | 7/2002 |
| JP | 2006-027324 A | 2/2006 |
| JP | 2011-162128 A | 8/2011 |
| WO | 01/12495 A1 | 2/2001 |

OTHER PUBLICATIONS

International Search Report as issued in International Patent Application No. PCT/JP2015/068069, dated Sep. 1, 2015.
Extended European Search Report EP Application No. 15811452.0 dated Nov. 15, 2017.

* cited by examiner

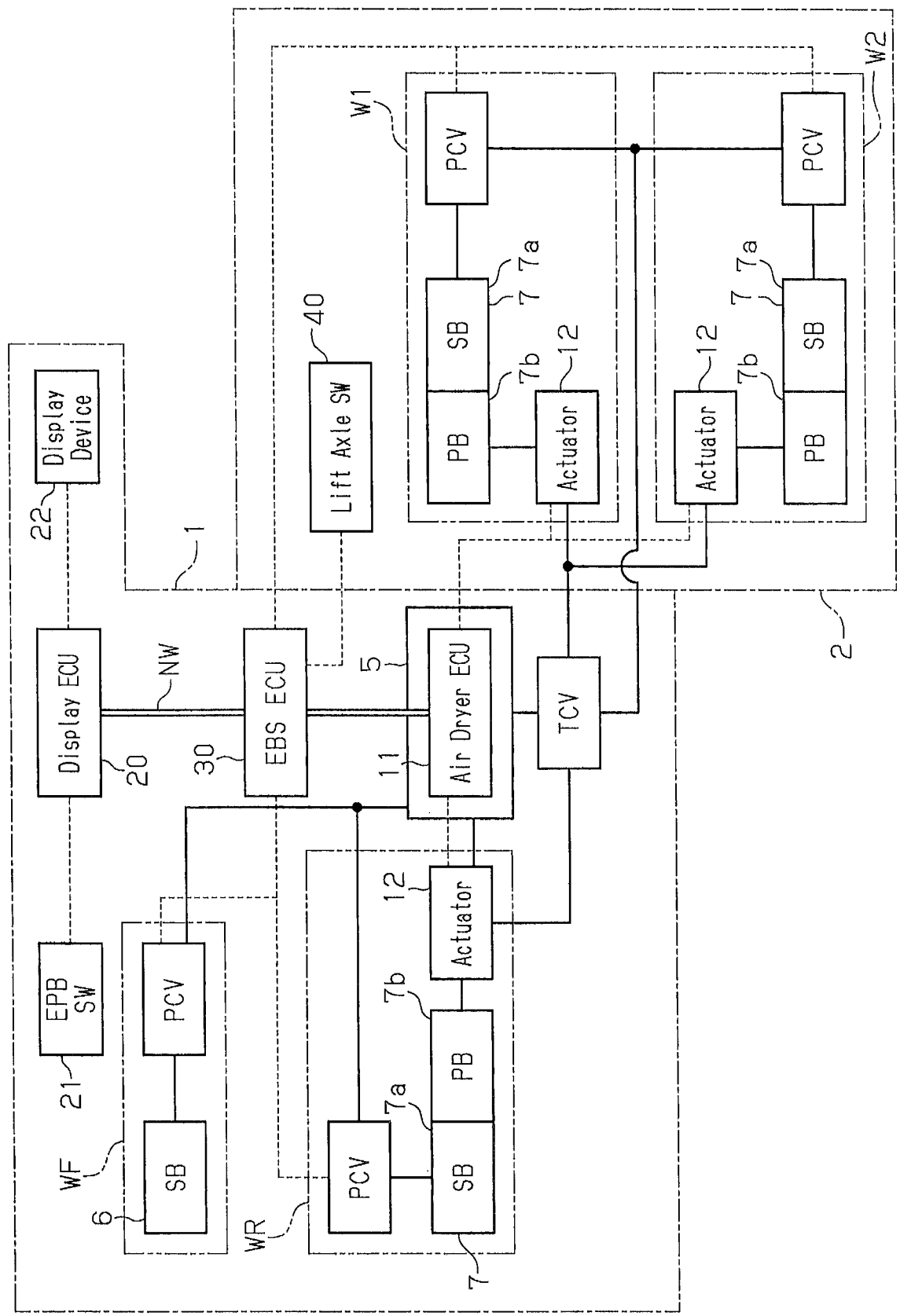

BRAKE SYSTEM AND BRAKE CONTROL METHOD

CROSS-REFERENCE TO RELATED APPLICATIONS

This application is the U.S. National Stage of PCT/JP2015/068069, filed Jun. 23, 2015, which in turn claims priority to Japanese Patent Application No. JP 2014-128763, filed Jun. 24, 2014. The contents of these applications are incorporated herein by reference in their entireties.

TECHNICAL FIELD

The present invention relates to an on-vehicle brake system having a lift axle capable of ascending and descending and to a brake control method.

BACKGROUND ART

Vehicles for cargo transport include a tractor-trailer that includes a tractor having a drive source and a trailer towed by the tractor. The trailer is coupled to the tractor with a coupler.

A large-size trailer is provided with axles, and wheels are arranged at the opposite ends of each axle. Thus, when the trailer travels in a state in which the load amount is large, e.g., when a cargo with the maximum capacity amount is loaded on the trailer, the contact pressure of each wheel becomes less than or equal to a predetermined value. However, when the trailer travels in a state in which no cargo is loaded or in which the load amount is small, traveling with all the wheels on the ground increases fuel consumption and wears the road surface.

Thus, a lift axle has been developed that lifts wheels attached thereto from the road surface. Specifically, the lift axle is one of the axles provided for a trailer and is capable of ascending and descending according to the load amount of the cargo (e.g., refer to Patent Document 1).

PRIOR ART DOCUMENT

Patent Document

Patent Document 1: Japanese Laid-Open Patent Publication No. 2006-27324

SUMMARY OF THE INVENTION

Problem that the Invention is to Solve

In a trailer provided with a lift axle disclosed in Patent Document 1, even if the wheels of the axle capable of ascending are off the ground, filling and discharge of compressed air are performed for the service brake and the parking brake of the axle capable of ascending. Because of this, compressed air is wastefully consumed in the axle that does not cause breaking force in the brake system of a vehicle provided with the above lift axle. Thus, it is desired to limit the wasted consumption of compressed air when the lift axle is lifted. Not only trailers but also vehicles having lift axles generally have such an objective in common.

Accordingly, it is an objective to provide a brake system and a brake control method that limits wasted consumption of compressed air when a lift axle is lifted.

Means for Solving the Problems

Means to achieve the above objective and its operational advantage will now be described.

To achieve the above objective, a brake system includes a service brake and a parking brake that brake a vehicle including a lift axle capable of ascending and descending. The brake system includes a brake blocker device that blocks at least one of supply of compressed air to the service brake and supply of compressed air to the parking brake, in which the service brake and the parking brake act on the lift axle, and a controller that controls the brake blocker device. The controller actuates the brake blocker device when the lift axle is at a lifted position.

To solve the above objective, a brake control method for a brake system includes a service brake and a parking brake that brake a vehicle including a lift axle capable of ascending and descending. The brake system includes a brake blocker device that blocks at least one of supply of compressed air to the service brake and supply of compressed air to the parking brake, which operate the lift axle, and a controller that controls the brake blocker device. The controller actuates the brake blocker device when the lift axle is located at a lifted position.

According to the above configuration or method, the brake blocker device is actuated for the lift axle that is located at the lifted position, and supply of compressed air to at least one of the service brake and the parking brake is blocked. The wheels that are off the ground by the axle being lifted do not need breaking force. Thus, wasted consumption of compressed air is limited by blocking supply of compressed air for the brake of the lifted axle.

Preferably, in the brake system, the controller is connected to an on-vehicle network, which forwards data of devices connected to each other, and obtains operation information of the lift axle via the on-vehicle network.

According to the above configuration, the controller can easily obtain the operation information of the lift axle via the on-vehicle network.

Preferably, in the brake system, the controller is arranged in an air dryer that dries compressed air to be supplied to the brake system.

According to the above configuration, the controller, which is provided for the air dryer located in the vicinity of the brake system, controls the air dryer as well as the brake blocker device. Thus, the same controller can control the brake system and the air dryer together.

Preferably, in the brake system, as the controller, any of a controller for an electronic brake system, a controller for an antilock brake system, and a controller for a traction control system for controlling the service brake is used.

According to the above configuration, any of the controller for the electronic brake system, the controller for the antilock brake system, and the controller for the traction control system controls the brake blocker device. Thus, supply of compressed air to the service brake can be blocked by utilizing the already mounted control system of the service brake.

Preferably, in the brake system, as the controller, a controller for an electric parking brake that controls the parking brake is used.

In the configuration, the controller for the electric parking brake controls the brake blocker device. Thus, supply of compressed air to the parking brake can be blocked by utilizing the already mounted control system.

Preferably, in the brake system, the brake blocker device is a solenoid valve arranged in a supply passage through which compressed air is supplied to the service brake or the parking brake.

According to the above configuration, the controller applies current to the solenoid valve to easily block supply of compressed air.

Effects of the Invention

The present invention limits the wasted consumption of compressed air when the lift axle is lifted.

BRIEF DESCRIPTION OF THE DRAWING

FIG. 1 is a block diagram illustrating the schematic configuration of a brake system according to one embodiment.

MODES FOR CARRYING OUT THE INVENTION

With reference to FIG. 1, a brake system and a brake control method according to one embodiment will be described. The brake system and the brake control method are employed in a tractor-trailer. The brake system includes both a parking brake and a service brake as air brakes that use compressed dry air as drive sources. The tractor-trailer is a vehicle in which a trailer 2 is coupled to a tractor 1.

As shown FIG. 1, the tractor 1, which tows the trailer 2, is provided with a front wheel axle WF and a rear wheel axle WR. A service brake chamber 6 that provides only a service brake (SB) is placed at each wheel of the front wheel axle WF of the tractor 1. A spring brake chamber 7 that provides a service brake (SB) and a parking brake (PB) is placed at each wheel of the rear wheel axle WR. The trailer 2 is provided with two axles, a first axle W1 and a second axle W2. A spring brake chamber 7, which provides a service brake (SB) and a parking brake (PB), is placed at each wheel of the trailer 2.

In addition, the tractor 1 includes an air dryer 5. The air dryer 5 dries compressed air supplied from a compressor (not shown) and supplies the compressed dry air to the service brake chambers 6 and the spring brake chambers 7 via a tank (not shown).

Each axle, WR, W1, W2 is provided with an actuator 12 that operates the corresponding parking brake. The actuator 12 is controlled by an air dryer electronic control unit (ECU) 11 as a controller provided for the air dryer 5, and compressed dry air is supplied to the actuator 12 from the air dryer 5. The actuator 12 includes a solenoid valve. The air dryer ECU 11 applies current to the solenoid valve to control the actuator 12. Compressed dry air is supplied to the actuators 12 of the trailer 2 from the air dryer 5 via a trailer control valve TCV. The trailer control valve TCV is a valve that delivers, to the trailer 2, compressed dry air that controls the service brakes and compressed dry air that controls the parking brakes.

Each actuator 12 is connected to a second control compartment 7b that controls the parking brake of the corresponding spring brake chamber 7. The actuator 12 supplies compressed dry air to the second control compartment 7b of the spring brake chamber 7. In the spring brake chamber 7, when the second control compartment 7b is filled with compressed dry air, the parking brake is released. In contrast, when the compressed dry air is discharged from the second control compartment 7b, the parking brake is actuated by a spring.

The air dryer 5 is connected to the first control compartment 7a, which controls the service brake of the spring brake chamber 7, via the pressure control valve PCV in each axle.

The air dryer 5 supplies compressed dry air to the first control compartments 7a of the spring brake chambers 7. In each spring brake chamber 7, when the first control compartment 7a is filled with compressed dry air, the service brake is actuated. Alternatively, when the compressed dry air is discharged from the first control compartment 7a, the service brake is released.

Each pressure control valve PCV can control how much the service brake works by controlling pressure. The pressure control valve PCV is controlled by an EBS ECU 30, which is a controller for an electronic brake system (EBS). The pressure control valve PCV includes a solenoid valve. The EBS ECU 30 applies current to the solenoid valve to control the pressure control valve PCV. When the brake pedal is depressed, the EBS ECU 30 controls the pressure control valves PCV such that braking force is optimally controlled and distributed to the wheels based on the revolution speed and turn states of the front and rear wheels.

The air dryer ECU 11 and the EBS ECU 30 are connected via an on-vehicle network NW such as a CAN, which forwards data of devices connected to each other. A display ECU 20 is connected to the air dryer ECU 11 and the EBS ECU 30 via the on-vehicle network NW. The display ECU 20 controls a display device 22. For example, when the parking brake is actuated, the display ECU 20 causes the display device 22 to display an indication such as a mark indicating the actuation of the parking brake. The display ECU 20 is connected to an electric parking brake switch (EPB SW) 21. When the EPB SW 21 is manipulated, the EPB SW 21 outputs an electric signal to the display ECU 20. The display ECU 20 outputs an electric signal according to the manipulation of the EPB SW 21 to the EBS ECU 30. The EBS ECU 30 controls the service brakes according to the manipulation of the EPB SW 21.

The trailer 2 according to the present embodiment includes a lift axle that can ascend and descend between a lifted position, at which the wheels are off the ground, and a lowered position, at which the wheels are on the ground. In a state in which no cargo is loaded or a state in which the load amount is small, the lift axle, which is capable of ascending and descending, is lifted to pull up the wheels provided on the axle from the road surface. The axle capable of ascending and descending is the first axle W1 of the trailer 2. When a lift axle SW 40 provided for the trailer 2 is manipulated, the first axle W1 is lifted, and the wheels of the first axle W1 are no longer on the ground. The lift axle SW 40 is electrically connected to the EBS ECU 30. The air dryer ECU 11 obtains the operation information of the lift axle via the on-vehicle network NW.

The brake system according to the present embodiment includes a brake blocker device and a controller that controls the brake blocker device. The brake blocker device respectively blocks supply of compressed dry air to the parking brake and supply of compressed dry air to the service brake, which operate the first axle W1, which is the lift axle. In other words, the brake blocker device that supplies compressed dry air to a service brake is the pressure control valve PCV that supplies compressed dry air to the first control compartment 7a of the spring brake chamber 7. The controller that controls the pressure control valve PCV, which is the brake blocker device, is the EBS ECU 30. The brake blocker device that supplies compressed dry air to the parking brake is the actuator 12 that supplies compressed dry air to the second control compartment 7b of the corresponding spring brake chamber 7. The controller that controls the actuator 12, which is the brake blocker device, is the air dryer ECU 11.

When the wheels of the first axle W1 capable of ascending and descending are on the ground, the EBS ECU 30 actuates the service brake via the PCV pressure control valve of each axle WF, WR, W1, W2 according to the depressing manipulation of the brake pedal. The air dryer ECU 11 actuates the parking brake via the actuator 12 in each axle WR, W1, W2 according to the manipulation of the EPB SW 21.

In contrast, based on the lift operation information obtained via the on-vehicle network NW, when it is determined that the first axle W1 capable of ascending and descending is lifted so that the wheels of the first axle W1 are off the ground, regardless of the depressing manipulation of the brake pedal, the EBS ECU 30 blocks supply of compressed dry air from the pressure control valve PCV of the first axle W1 to the first control compartment 7a, which controls the service brake. In each axle WF, WR, W2 except the first axle W1, according to the depressing manipulation of the brake pedal, the EBS ECU 30 actuates the service brake by supplying compressed dry air from the pressure control valve PCV to the first control compartment 7a, which controls the service brake. In addition, based on the lift operation information obtained via the on-vehicle network NW, when it is determined that the first axle W1 capable of ascending and descending is lifted and so that the wheels of the first axle W1 are off the ground, regardless of manipulation of the EPB SW 21, the air dryer ECU 11 blocks supply of compressed dry air from the actuator 12 of the first axle W1 to the second control compartment 7b, which controls the parking brake. In each axle WF, WR, W2 except the first axle W1, according to manipulation of the EPB SW21 to actuate the parking brake, the air dryer ECU 11 supplies compressed dry air from the actuator 12 to the second control compartment 7b, which controls the parking brake.

In this way, in the brake system according to the present embodiment, when the first axle W1 of the trailer 2, which is the lift axle, is lifted, supply of compressed air to the service brake and the parking brake of the first axle W1 is blocked. This limits wasted consumption of compressed air at the axle having the wheels that are off the ground.

As described above, the present embodiment provides the following advantages.

(1) Supply of compressed air to the service brake and the parking brake is blocked by actuating the actuator 12 and the pressure control valve PCV, which are brake blocker devices, for the first axle W1, which is a lift axle and located at the lifted position. The wheels that are off the ground by the lifted axle do not need braking force. Thus, wasted consumption of compressed air is limited by blocking supply of compressed air to the brake of the lifted axle.

(2) The EBS ECU 30 and the air dryer ECU 11 can easily obtain the operation information of the lift axle via on-vehicle network NW.

(3) The controller provided for the air dryer located in the vicinity of the brake system controls the air dryer as well as the brake blocker device. Thus, the same controller can control the brake system and the air dryer together.

(4) The EBS ECU 30 controls the pressure control valve PCV. Thus, supply of compressed air to the service brake can be blocked using the control mechanism of the service brake that the EBS ECU 30 has.

(5) The air dryer ECU 11, which is the controller for the electric parking brake (EPB) controls the actuator 12. Thus, supply of compressed air to the parking brake can be blocked using the control mechanism of the parking brake that the air dryer ECU 11 has.

(6) The air dryer ECU 11 can easily block supply of compressed air by applying current to the solenoid valve of the actuator 12. The EBS ECU 30 can easily block supply of compressed air by applying current to the solenoid valve of the pressure control valve PCV.

The above-illustrated embodiment may be modified in the following forms.

When the first axle W1 capable of ascending and descending is lifted, supply of compressed dry air to the first control compartment 7a and the second control compartment 7b may be blocked after braking force is applied to the wheels of the first axle W1 by the service brake or the parking brake. This limits the rotation of the wheels that are located at the lifted position. For example, when manipulation of the lift axle switch SW lifts the first axle W1, the EBS ECU 30 determines whether the service brake is actuated by filling the first control compartment 7a of the first axle W1 with compressed dry air. When determining that the service brake is actuated, the EBS ECU 30 continuously stops supply and discharge of air to the first control compartment 7a. Alternatively, when determining that the service brake is not actuated, the EBS ECU 30 fills the first control compartment 7a with compressed dry air and then stops supply and discharge of air to the first control compartment 7a. Before supply and discharge of air to the first control compartment 7a are stopped, the air filling amount of the first control compartment 7a may be adjusted such that the braking force of the wheels of the first axle W1 becomes a predetermined braking force less than the maximum braking force by the service brake. The predetermined braking force is a braking force such that, e.g., the wheels lifted by the lift axle can rotate when hitting a road surface that is raised in a protruding shape. This reduces a load applied to components that constitute the service brake mechanism by rotation of the wheels even when the wheels lifted by the lift axle hit the road surface. Alternatively, when the lift axle switch SW is manipulated to lift the first axle W1, the air dryer ECU 11 determines whether the parking brake is actuated by discharging compressed dry air from the second control compartment 7b of the first axle W1. When determining that compressed dry air is discharged from the second control compartment 7b and the parking brake is actuated, the air dryer ECU 11 continuously stops supply of air to the second control compartment 7b. When determining that the parking brake 11 is not actuated, the air dryer ECU 11 discharges compressed dry air from the second control compartment 7b and then stops supply of air to the second control compartment 7b. This may be omitted when it is unnecessary to determine the operation state of the service brake or the parking brake such as when the lift axle switch SW cannot be manipulated unless the parking brake is actuated. In general, after the lift axle switch SW is manipulated, the operation of the lift axle is started, and the service brake or the parking brake then applies braking force to the wheels of the first axle W1. However, e.g., when the vehicle is stopped, the braking force may be applied to the wheels of the first axle W1 before operation of the lift axle of the first axle W1 is started.

The first control compartment 7a of the spring brake chamber 7 may be configured to actuate the service brake by discharging compressed dry air and to release the service brake by filling with compressed dry air. The second control compartment 7b of the spring brake chamber 7 may be configured to actuate the parking brake by filling with compressed dry air and to release the parking brake by discharging compressed dry air.

In the above-illustrated embodiment, the air dryer ECU 11 causes the actuator 12 to block supply of compressed air to the parking brake. However, another ECU may cause the actuator 12 to block supply of compressed air to the parking brake. For example, the EBS ECU or any of an ECU for an electric parking brake system (EPB), an ECU for an antilock brake system (ABS), and an ECU for traction control system (TCS), which are separately provided, causes the actuator 12 to block supply of compressed air to the parking brake.

In the above-illustrated embodiment, the EBS ECU 30 causes the pressure control valve PCV to block supply of compressed air to the service brake. However, another ECU may cause the pressure control valve PCV to block supply of compressed air to the service brake. For example, the air dryer ECU or any of an ECU for an electric parking brake system (EPB), an ECU for an antilock brake system (ABS), and an ECU for traction control system (TCS), which are separately provided, causes the pressure control valve PCV to block supply of compressed air to the service brake.

In the above-illustrated embodiment, with respect to the service brake chamber 6 and the spring brake chamber 7 of each axle W1, W2, WF, WR, the brakes are controlled for each axle W1, W2, WF, WR. However, the left and right brakes may be separately controlled in each axle W1, W2, WF, WR.

In the above-illustrated embodiment, the trailer 2 has two axles W1 and W2, and the first axle W1 of the trailer 2 is lifted. However, when two or more axles are lifted in a trailer having three or more axles, supply of compressed dry air to the service brake and the parking brake of at least one of the ascendable axles may be stopped. This limits wasted consumption of compressed air.

In the above-illustrated embodiment, supply of compressed dry air to both the service brake and the parking brake mounted on the ascendable axle is stopped when the axle is located at the lifted position. However, supply of compressed dry air to only one of the service brake and the parking brake mounted on the ascendable axle may be stopped when the axle is located at the lifted position.

In the above-illustrated embodiment, the ascendable first axle W1 of the trailer 2 having the lift axle is provided with the spring brake chamber 7 having the service brake and the parking brake. However, the ascendable first axle W1 of the trailer 2 may include a service brake chamber 6 having only a service brake without a parking brake.

In the above-illustrated embodiment, if the tractor 1 has a lift axle, which is an ascendable axle of the tractor 1, supply of compressed dry air to at least one of the service brake and the parking brake may be stopped when the axle is at the lifted position.

In the above-illustrated embodiment, the operation information of a lift axle is obtained via the on-vehicle network NW. However, the operation information of the lift axle may be directly obtained without using the on-vehicle network NW. For example, the operation information is directly obtained from the controller that executes a lift axle operation. The operation information may be obtained from a sensor and the like that is arranged in the vicinity of a wheel and detects that the wheel is on the ground.

In the above-illustrated embodiment, the brake system and the brake control method are applied to a tractor-trailer that includes the tractor 1, which is a towing car, and the trailer 2, which is a towed car. However, the brake system and the brake control method may be applied to an integrated vehicle, e.g., a bus and a truck, which is not separated into a towing car and a towed car, as long as the vehicle includes a lift axle.

DESCRIPTION OF REFERENCE NUMERALS

1 . . . tractor, 2 . . . trailer, 3 . . . engine, 4 . . . compressor, 5 . . . air dryer, 6 . . . service brake chamber, 7 . . . spring brake chamber, 7a . . . first control compartment, 7b . . . second control compartment, 11 . . . air dryer ECU, 12 . . . actuator, 20 . . . display ECU, 21 . . . EPB SW, 22 . . . display device, 30 . . . EBS ECU, 40 . . . lift axle SW, NW . . . on-vehicle network, PCV . . . pressure control valve, TCV . . . trailer control valve, W1 . . . first axle, W2 . . . second axle, WF . . . front wheel axle, WR . . . rear wheel axle.

The invention claimed is:

1. A brake system comprising a service brake and a parking brake that are configured to brake a vehicle including a lift axle capable of ascending and descending, the brake system comprising:
   a brake blocker device configured to block at least one of supply of compressed dry air to the service brake and supply of compressed dry air to the parking brake,
   wherein the service brake and the parking brake are configured to act on the lift axle; and
   an electronic controller electrically connected to an on-vehicle network, which forwards data of devices connected to each other, and is configured to electrically obtain operation information of the lift axle via the on-vehicle network and control application of electrical current to the brake blocker device,
   wherein the operation information indicates whether the lift axle is at a lifted position,
   wherein the electronic controller actuates the brake blocker device by applying the electrical current to the brake blocker device in response to determining that the lift axle is at the lifted position based on the operation information of the lift axle, and
   wherein the electronic controller is arranged in any of an air dryer that dries compressed air to be supplied to the brake system, an electronic brake system, a traction control system, and an electric parking brake that controls the parking brake.

2. The brake system according to claim 1, wherein the brake blocker device is a solenoid valve arranged in a supply passage through which compressed dry air is supplied to the service brake or the parking brake.

3. A brake control method for a brake system including a service brake and a parking brake that are configured to brake a vehicle including a lift axle capable of ascending and descending, wherein the brake system includes:
   a brake blocker device configured to block at least one of supply of compressed dry air to the service brake and supply of compressed dry air to the parking brake, which operate the lift axle; and
   an electronic controller configured to control application of electrical current to the brake blocker device, configured to be electrically connected to an on-vehicle network, which forwards data of devices connected to each other, and configured to be arranged in any of an air dryer that dries compressed air to be supplied to the brake system, an electronic brake system, a traction control system, and an electric parking brake that controls the parking brake, and
   the brake control method comprising:
   by the electronic controller, electrically obtaining operation information of the lift axle via the on-vehicle network, wherein the operation information indicates whether the lift axle is at a lifted position, and by the electronic controller, actuating the brake blocker device by applying the electrical current to the brake blocker device in response to determining that the lift axle is located at the lifted position based on the operation information of the lift axle.

4. A brake system comprising a service brake and a parking brake that are configured to brake a vehicle including a lift axle capable of ascending and descending, the brake system comprising:
- a brake blocker device configured to block at least one of supply of compressed dry air to the service brake and supply of compressed dry air to the parking brake, wherein the service brake and the parking brake are configured to act on the lift axle; and
- an electronic controller configured to control application of electrical current to the brake blocker device and electrically connected to an on-vehicle network, which forwards data of devices connected to each other, wherein the electronic controller is configured to:
- electrically obtain operation information of the lift axle via the on-vehicle network, wherein the operation information indicates whether the lift axle is at a lifted position, and
- in response to determining that the lift axle is at the lifted position based on the operation information of the lift axle, actuate the brake blocker device by applying the electrical current to the brake blocker device, and wherein the electronic controller is arranged in any of an air dryer that dries compressed air to be supplied to the brake system, an electronic brake system, a traction control system, and an electric parking brake that controls the parking brake.

* * * * *